US011859378B2

(12) United States Patent
Trumbull

(10) Patent No.: US 11,859,378 B2
(45) Date of Patent: Jan. 2, 2024

(54) PORTABLE MOTION PICTURE THEATER

(71) Applicant: Magi International, LLC, Southfield, MA (US)

(72) Inventor: Douglas Trumbull, Southfield, MA (US)

(73) Assignee: MAGI INTERNATIONAL LLC, Southfield, MA (US)

( * ) Notice: Subject to any disclaimer, the term of this patent is extended or adjusted under 35 U.S.C. 154(b) by 0 days.

(21) Appl. No.: 17/983,635

(22) Filed: Nov. 9, 2022

(65) Prior Publication Data

US 2023/0279656 A1 Sep. 7, 2023

Related U.S. Application Data

(63) Continuation of application No. 17/025,186, filed on Sep. 18, 2020, now abandoned, which is a continuation of application No. 16/242,485, filed on Jan. 8, 2019, now abandoned, which is a continuation
(Continued)

(51) Int. Cl.
| | |
|---|---|
| *E04B 1/343* | (2006.01) |
| *A47C 1/124* | (2006.01) |
| *A63J 25/00* | (2009.01) |
| *G03B 21/60* | (2014.01) |
| *G03B 31/00* | (2021.01) |
| *G03B 35/16* | (2021.01) |

(Continued)

(52) U.S. Cl.
CPC .......... *E04B 1/34321* (2013.01); *A47C 1/124* (2013.01); *A63J 25/00* (2013.01); *G03B 21/60* (2013.01); *G03B 31/00* (2013.01); *G03B 35/16* (2013.01); *E04B 1/32* (2013.01); *E04B 2001/327* (2013.01); *E04B 2001/3294* (2013.01); *E04B 2001/34389* (2013.01); *E04H 3/30* (2013.01)

(58) Field of Classification Search
CPC ....... E04B 1/34321; E04B 2001/34389; G03B 35/16; G03B 31/00; G03B 21/60; A47C 1/124; A63J 25/00; E04H 3/30
See application file for complete search history.

(56) References Cited

U.S. PATENT DOCUMENTS

| | | |
|---|---|---|
| 4,577,103 A | 3/1986 | Geary et al. |
| 5,717,415 A | 2/1998 | Iue et al. |
| 5,724,775 A | 3/1998 | Zobel, Jr. et al. |

(Continued)

FOREIGN PATENT DOCUMENTS

| | | |
|---|---|---|
| WO | 2001006894 | 2/2001 |
| WO | 2011078883 | 6/2011 |

OTHER PUBLICATIONS

International Preliminary Report on Patentability for PCT Application No. PCT/US2017/041102 dated Jan. 17, 2019, 12 pages.
(Continued)

*Primary Examiner* — Rodney Mintz
(74) *Attorney, Agent, or Firm* — Finch & Maloney PLLC

(57) ABSTRACT

A portable theater includes a plurality of individual panels assembled together to form a theater enclosure, a plurality of audience seats installed within the assembled theater enclosure, and a projection screen mounted within the assembled theater enclosure. The projection screen has a partial toroidal shaped reflective surface configured to reflect, toward the plurality of audience seats, a moving image as projected by a projector.

14 Claims, 7 Drawing Sheets

Related U.S. Application Data of application No. PCT/US2017/041102, filed on Jul. 7, 2017.

(60) Provisional application No. 62/359,943, filed on Jul. 8, 2016.

(51) Int. Cl.
*E04H 3/30* (2006.01)
*E04B 1/32* (2006.01)

(56) References Cited

U.S. PATENT DOCUMENTS

| | | | |
|---|---|---|---|
| 6,874,889 | B1 | 4/2005 | Hill |
| 7,106,411 | B2 | 9/2006 | Read et al. |
| 7,295,244 | B2 | 11/2007 | Manico et al. |
| 7,473,475 | B1 | 1/2009 | Matheny et al. |
| 7,573,475 | B2 | 8/2009 | Sullivan et al. |
| 8,259,162 | B2 | 9/2012 | Kim et al. |
| 8,358,332 | B2 | 1/2013 | Hendrickson et al. |
| 8,421,991 | B2 | 4/2013 | Read et al. |
| 8,955,258 | B2 | 2/2015 | Jacques et al. |
| 9,204,132 | B2 | 12/2015 | Trumbull |
| 9,371,179 | B2 | 6/2016 | Miller et al. |
| 9,523,209 | B2 | 12/2016 | de Lespinois et al. |
| 9,848,182 | B2 | 12/2017 | Trumbull |
| 11,462,180 | B1 * | 10/2022 | Griffin ............... H04N 9/3108 |
| 2002/0009137 | A1 | 1/2002 | Nelson et al. |
| 2003/0184674 | A1 | 10/2003 | Manico et al. |
| 2005/0036645 | A1 | 2/2005 | Carver |
| 2005/0248726 | A1 | 11/2005 | Read et al. |
| 2006/0150530 | A1 | 7/2006 | Davey |
| 2007/0146478 | A1 | 6/2007 | Butler-Smith et al. |
| 2007/0279415 | A1 | 12/2007 | Sullivan et al. |
| 2009/0160934 | A1 | 6/2009 | Hendrickson et al. |
| 2009/0195640 | A1 | 8/2009 | Kim et al. |
| 2011/0116048 | A1 | 5/2011 | Read et al. |
| 2011/0279781 | A1 | 11/2011 | Wei et al. |
| 2012/0268570 | A1 | 10/2012 | Trumbull |
| 2013/0167452 | A1 | 7/2013 | Jacques et al. |
| 2014/0197168 | A1 | 7/2014 | Miller et al. |
| 2015/0146172 | A1 | 5/2015 | Maillard et al. |
| 2019/0277017 | A1 * | 9/2019 | Trumbull ............... G03B 21/60 |
| 2020/0092539 | A1 | 3/2020 | Trumbull |
| 2021/0238842 | A1 | 8/2021 | Trumbull |
| 2022/0191465 | A1 | 6/2022 | Trumbull |

OTHER PUBLICATIONS

International Preliminary Report on Patententability, received in PCT Application No. PCT/US2010/003251, dated Jun. 26, 2012, 6 pages.

International Search Report and Written Opinion Received for PCT Application PCT/US2017/041102, dated Sep. 14, 2017.

International Search Report, received in PCT Application No. PCT/US2010/003251, dated Apr. 18, 2011, 3 pages.

Luczak et al., "Spatio-Temporal Scalability Using Modified MPEG-2 Predictive Video Coding", X European Signal Processing Conference, Eusipco 2000 CD-ROM Proceedings, vol. II, 16:30, Tampere, Finland, Sep. 4-8, 2000, 4 pages.

McAllister, Display Technology: Stereo & 3D Display Technologies, Department of Computer Science, North Carolina State University, published Jan. 15, 2002, 50 pages.

Trumbull Studios, "The Magi Process", WISTIA video, https://trumbull.wistia.com/medias/wque2mkk41, https://trumbull.wistia.com/login?redirect_to=https%3A%2F%2Ftrumbull.wistia.com%2Fprojects, Jan. 2015.

* cited by examiner

PORTABLE MOTION PICTURE THEATER

CROSS REFERENCE TO RELATED APPLICATIONS

This patent application is a continuation of U.S. application Ser. No. 17/025,186, entitled "PORTABLE MOTION PICTURE THEATER," filed on Sep. 18, 2020, which is a continuation of U.S. application Ser. No. 16/242,485, entitled "PORTABLE MOTION PICTURE THEATER," filed on Jan. 8, 2019, which is a continuation of International Application No. PCT/US2017/041102, entitled "PORTABLE MOTION PICTURE THEATER," filed on Jul. 7, 2017, which claims the benefit of U.S. Provisional Patent Application No. 62/359,943, entitled "METHOD AND APPARATUS FOR PROJECTING MOTION PICTURES IN A PREFABRICATED PORTABLE THEATER," filed on Jul. 8, 2016, each of which is incorporated herein by reference in its entirety.

TECHNICAL FIELD

Embodiments of the present disclosure relate to design, fabrication and erection of portable motion picture theaters. Such theaters can be configured to optimize the viewing of high resolution and high frame rate digitally projected motion picture images. The result of this disclosure is that a so-called "giant screen" stereoscopic motion picture effect can be achieved at low cost and in a relatively small space.

BACKGROUND

Conventional movie theaters often include a rectangular shaped room (theater), fitted with a slanted seating area for viewers facing a rectangular projection screen, a projection system, and a sound system. The most ubiquitous form of a conventional movie theater can be experienced in any of today's conventional multiplex cinemas, which include various sizes of theaters that offer an approximately 50-degree horizontal field of view from the average seat. The seats are arranged in rows and may be either modestly raked at some angle, or stadium style, with more extreme rake. Owing to the generally accepted ratio of theater width-to-length of 1:1.5, some seats are often too close to the screen and some are too far away to afford an ideal viewing experience of conventional motion pictures that adhere to industry standards of aspect ratios that range between 1:1.85 to 1:2.35. In contrast to conventional movie theaters, IMAX® theaters provide substantially larger screens and a square 1:1 width-to-length ratio, which provides greater than conventional field of view angles.

An assumption that is generally recognized by major theater chains is that the larger the screen, the better the viewing experience. While virtually all movie theaters around the world are purpose built one at a time, each is different to some degree. Assuming that a modest size theater with 100 seats costs a certain amount per seat, it is also understood that larger theaters cost more due to the architectural demands of larger and more expensive roof spans, larger overall volume of space, and up to triple normal costs per seat for giant screen theaters averaging 400 seats or greater.

An important aspect of the motion picture experience is that so-called "moving pictures" are made up of a series of still photographs projected in rapid succession, creating an illusion of motion. This illusion of motion is an artifact of certain human visual capabilities for persistence of vision that merges each of the rapidly projected individual frames of images into an apparently smoothly moving image. The so-called "fusion frequency" of the human eye has a threshold that allows for a minimum of 48 flashes of light per second, thus necessitating that each frame of a conventional 24 frame per second movie to be "flashed" two or more times each, resulting in 48 or more per second. This introduces an objectionable viewing experience known as "judder" or "strobing," since the human retina can retain two or more flashes as the eye tracks on-screen motion. A lower flash rate causes in objectionable flicker, resulting in the early term "flickers" associated with early silent movies projected at lower frame rates.

Nearly all conventional motion pictures for theaters are photographed and projected at 24 frames per second, including IMAX® and other giant screen formats, whether 35 mm, 70 mm, IMAX®, or digital. When these movies are projected onto conventionally sized screens with a typical field of view (of about 40 degrees horizontally), the human eye perceives the images as a seemingly continuous illusion of motion. However, when the field of view is increased, the angular motion from frame to frame increases as well, often resulting in objectionable blurring, strobing, or judder. For three-dimensional (3D) stereoscopic movies, these artifacts increase objectionable eyestrain, since they interfere with comfortable 3D stereoscopic viewing. Additionally, certain motions of the camera or subject can result in very disconcerting effects, such as inverted 3D space that results when the frame-to-frame displacement is larger than the stereoscopic left eye-right eye displacement.

SUMMARY

Reference is made to U.S. Pat. No. 9,204,132, entitled "Method and apparatus for photographing and projecting moving images in three dimensions," which is incorporated herein by reference in its entirety.

Embodiments of the present disclosure combine techniques disclosed in U.S. Pat. No. 9,204,132 with a portable theater design that addresses the aforementioned limitations of conventional giant screen theaters and also makes it possible to offer a giant screen viewer experience at a cost that is a small fraction of a conventional giant screen theater. According to an embodiment, images are projected at a high frame rate of 120 frames per second, which allows for a much wider field of view without the objectionable artifacts found in conventional projection systems and theaters. For example, blurring, strobing, and judder are minimized or eliminated since each frame is shown only once, thus offering audiences a seamless and smooth motion picture.

According to an embodiment, a portable theater includes a plurality of individual panels assembled together to form a theater enclosure, a plurality of audience seats installed within the assembled theater enclosure, and a projection screen mounted within the assembled theater enclosure. The projection screen has a partial toroidal shaped reflective surface configured to reflect, toward the plurality of audience seats, a moving image as projected by a projector. Numerous configurations and variations will be apparent in light of this disclosure.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
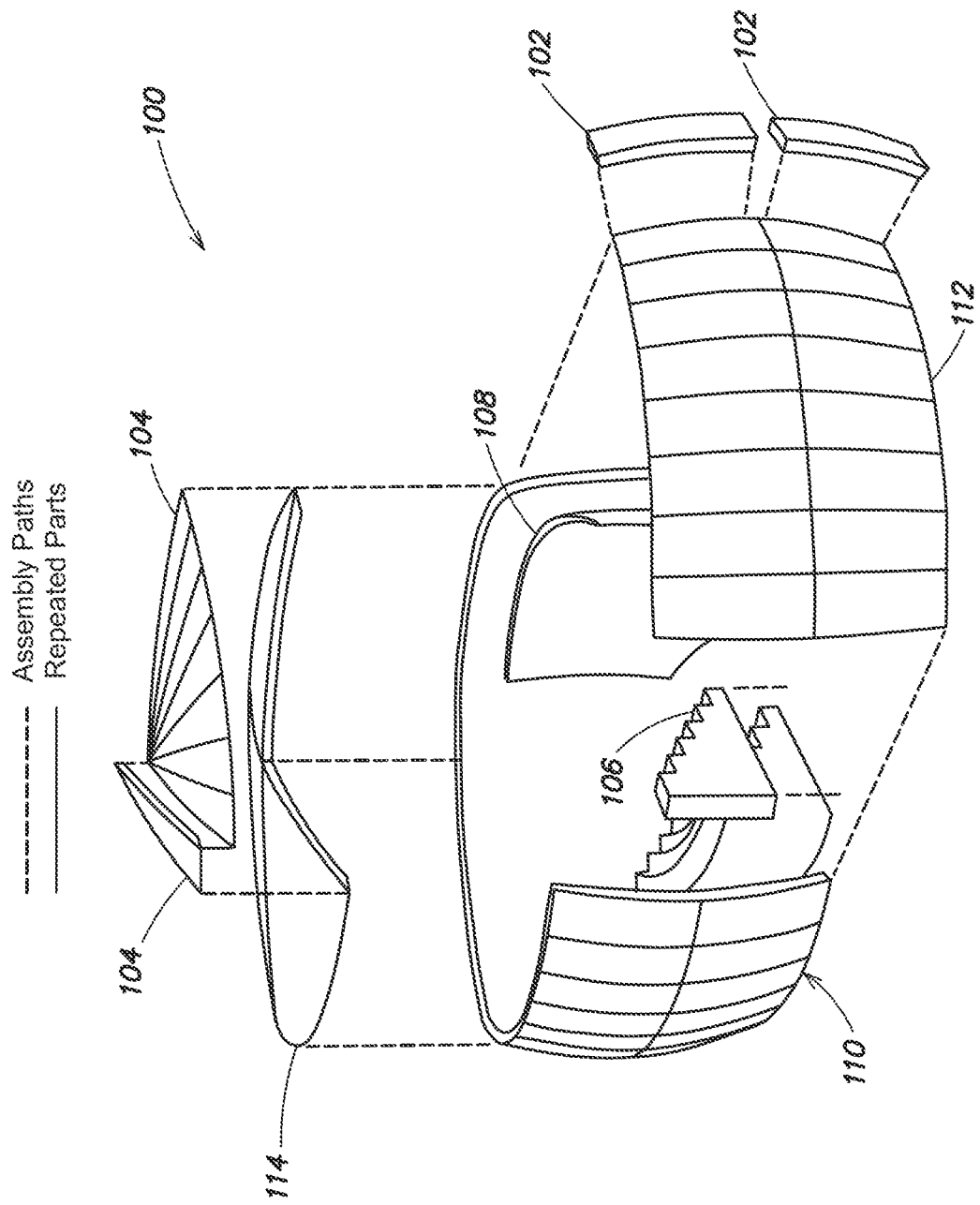
FIG. 1 shows a partially exploded perspective view of an example portable motion picture theater 100, in accordance with an embodiment of the present disclosure.

Embodiments of the present disclosure provide a series of solutions to many of the limitations of conventional theaters, including a prefabricated modular design that offers high frame rate, high brightness, low cross-reflectance, wide field of view, and ultra-high dynamic range sound.

According to an embodiment, a theater design is smaller than a conventional giant screen theater, which allows the screen surface to be positioned closer to viewers, thus reducing eyestrain that is associated with the disparity between focus and convergence. The human eye has muscles that control focus at a certain distance and convergence of the two eyes onto a single object of interest. These muscles are synchronized to perform simultaneously and together. Yet in a movie theater stereoscopic viewing demands that viewers' eyes converge on various distances, while remaining focused at the screen plane—straining these muscles, resulting in severe eyestrain. However, by making the screen smaller and closer, this disparity is greatly reduced, resulting in no reports of eyestrain for 3D.

According to an embodiment, various components of a theater are prefabricated in a factory, which lowers the cost per square foot of the theater to less than half that of purpose-built construction.

Thus, in comparison to the cost of conventional giant screen theater construction, which is three times the cost of conventional non-giant screen theaters, the resultant cost per seat via prefabrication in accordance with various embodiments can be as low as one-sixth that of a conventional giant screen theater on a per-seat basis.

Giant screen theaters create a tremendous "volumetric" demand for space on a cubic-foot basis, since fifty feet of empty space above each seat is not effectively used. On a volumetric space-use formula, many smaller theaters rather than one large theater offers an overall volumetric space saving of 2:1.

The result of the above-disclosed parameters is an extremely immersive giant screen 3D experience for viewers at a fraction of the cost.

An added benefit of the disclosed embodiments is that having many smaller theaters rather than fewer giant screen theaters optimizes the original intention of the multiplex theater concept that offers a variety of content spread over a wide range of show start times. This smooths the flow of viewers experience for ease of ticketing, convenience, continuous use of common areas for refreshments and toilets, and other aspects, increasing occupied seats and revenue.

Motion pictures for theaters, television, computers, tablets, and smartphones are assumed to be a flat rectangular image. This is different to some degree at theaters offering variously curved screens. One briefly successful deeply curved movie technology was Cinerama, offering a very wide field of view using triple 35 millimeter (mm) movies blended together onto a deeply curved screen, but cross-reflection was a severe problem. The widest field of view movie process became Omnimax (or IMAX Dome), using 70 mm movie projection onto a domed planetarium screen. There are three fundamental problems with deeply curved or dome shaped screens: (1) The horizontal field of view causes extreme blurring and strobing if the frame rate remains at 24 frames per second, (2) "Cross reflectance" of light from one side of the screen (or dome) to the other side washes out the contrast, and (3) The surface area is so great that it is almost impossible to achieve adequate image brightness—resulting in sub-standard contrast and color saturation.

FIG. 1 shows a partially exploded perspective view of an example portable motion picture theater 100, in accordance with an embodiment of the present disclosure. The theater 100 includes a plurality of individual panels 102, 104, a plurality of audience seats 106, and a projection screen 108. The panels 102, 104 are configured to be assembled together to form a theater enclosure, generally indicated at 110 in this partially exploded view. Some of the panels 102, when assembled together, form walls 112 of the theater enclosure 110, while some of the panels 104, when assembled together, form a ceiling 114 of the theater enclosure 110.

Figure 2A:
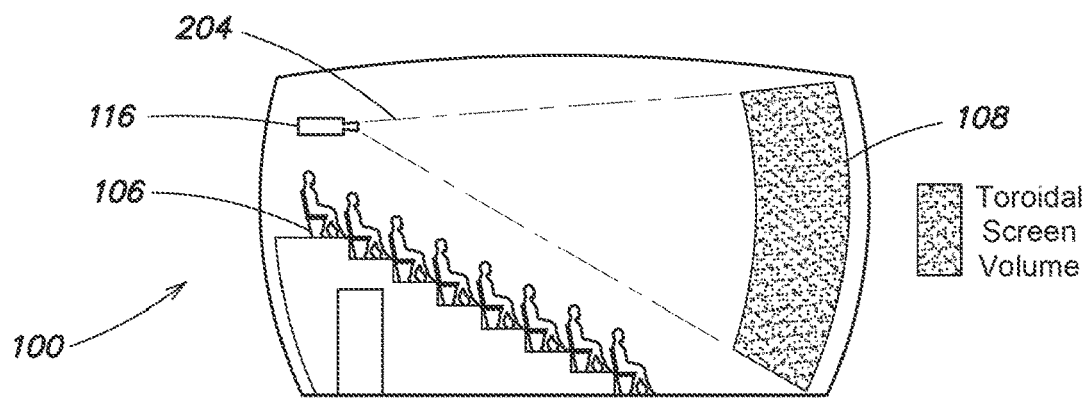
FIGS. 2A, 2B and 2C show elevation, front, and plan views, respectively, of the example portable motion picture theater of FIG. 1, in accordance with an embodiment of the present disclosure.
Figure 2B:
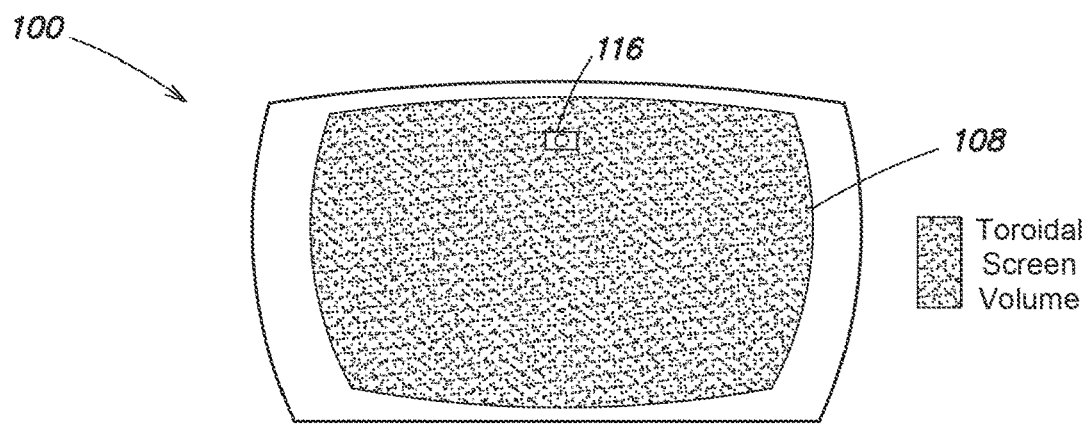
Figure 2C:
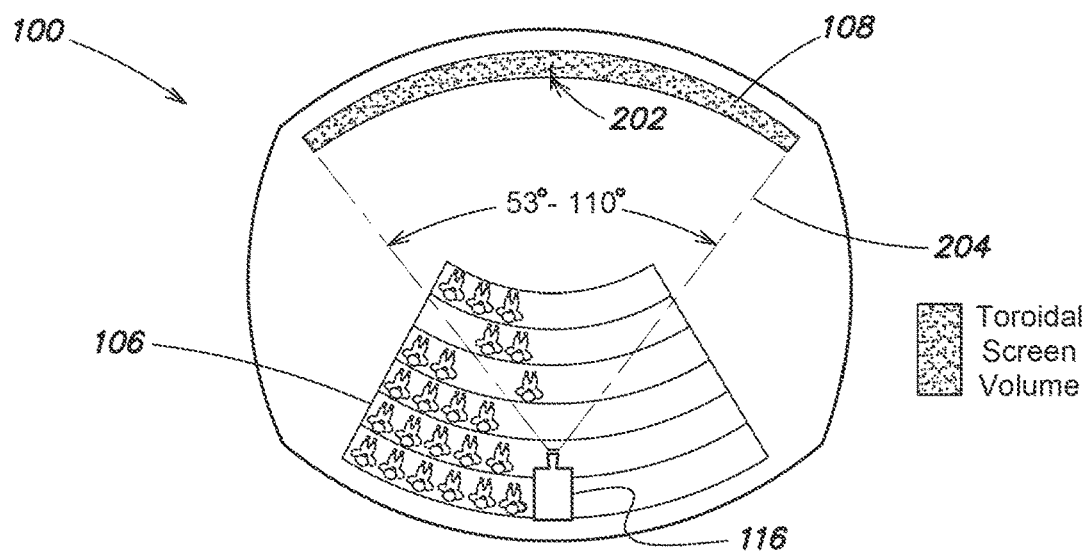
Figure 3:
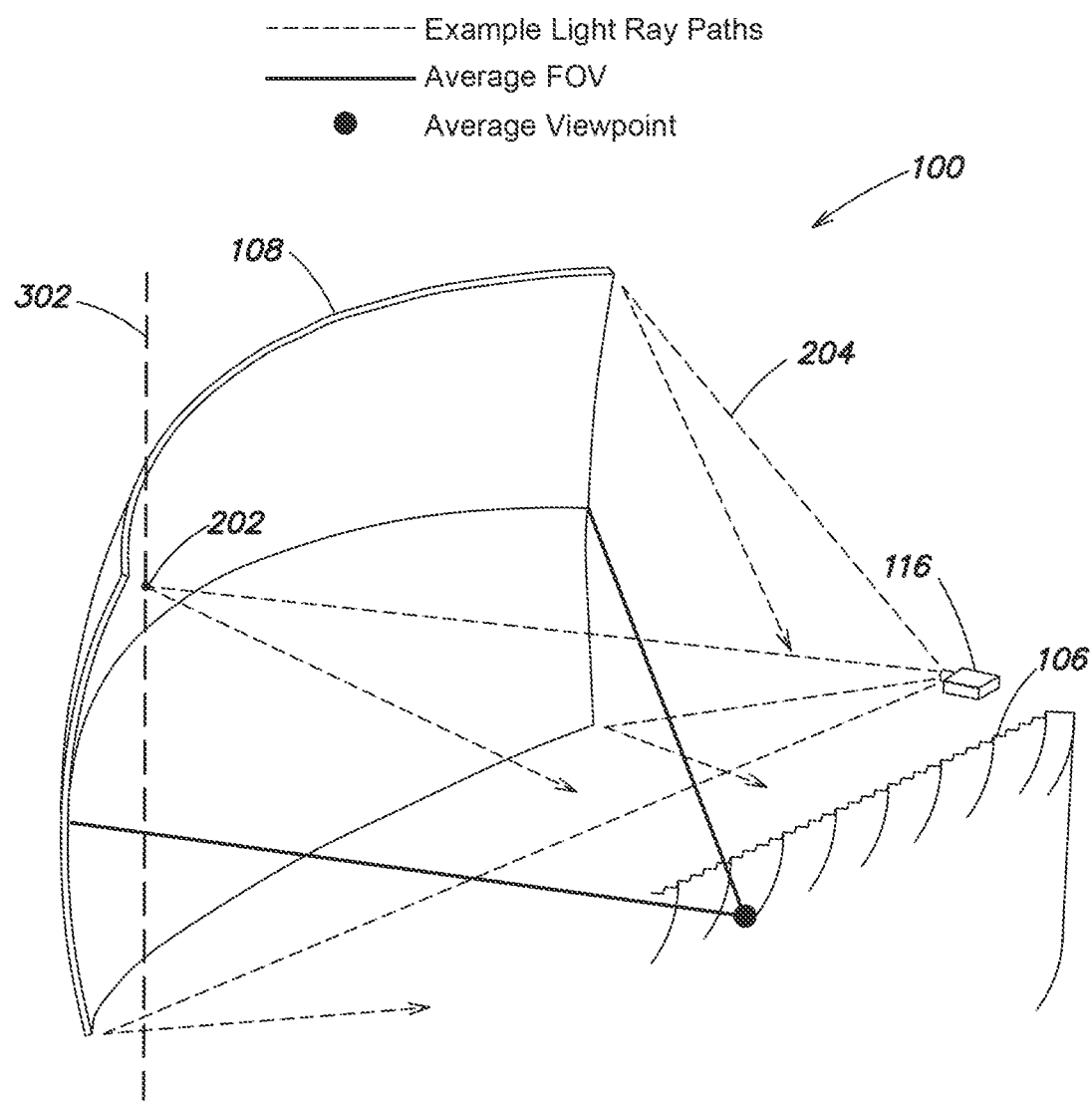
FIG. 3 shows a perspective view of the example motion picture theater of FIG. 1, in accordance with an embodiment of the present disclosure.

FIGS. 2A, 2B and 2C show elevation, front, and plan views, respectively, of the example portable motion picture theater 100 of FIG. 1, in accordance with an embodiment of the present disclosure. FIG. 3 shows a perspective view of a portion of the example motion picture theater 100 of FIG. 1 (for example, the walls 112 and the ceiling 114 are not shown), in accordance with an embodiment of the present disclosure. FIGS. 2A and 3 show views of the theater 100 in which the audience seats 106 are arranged on a raked platform such that seats closest to the screen 108 are lower than seats furthest from the screen 108.

The projection screen 108 is a high gain hemispheric (partial toroidal) shaped screen that offers a wide horizontal field of view (for example, approximately 53 degrees or greater, 80 degrees or greater, or 110 degrees or greater, depending on the location of a given seat 106 relative to the screen 108) by wrapping the image around the audience, as opposed to a conventional flat or slightly curved screen. The particular shape of the projection screen 108 is achieved by ray-tracing light emitted from a projector 116 (such as shown in FIGS. 2A and 2C) toward a reflective surface of the screen 108, and hemispherically curving the screen 108 by using computer aided design in the vertical and horizontal axes so that the projected light is reflected to the audience seating area like a large, curved mirror. In some embodiments, the reflective surface of the screen 108 multiplies the amount of perceived light by approximately three times, using a 3× gain aluminized screen surface or other highly reflective material. In some embodiments, the screen 108 is held in position against a structural member (not shown) by applying a pressure vacuum behind the screen 108, although other mounting techniques, including fasteners, hangers and the like, may be used instead of or in addition to the pressure vacuum. The height and width of the screen 108 determines the shape of the theater's walls 112, which are made of modular computer-designed segments or panels 102 that easily bolt together.

In some embodiments, a sensor-controlled fan motor (not shown) detects the position of the surface of the screen 108 and holds the surface at the desired curvature, turning the fan on as needed to retain the designed shape. The shape of the screen 108 defines the overall shape of the theater 100, so that little to no space is wasted.

The high gain reflective surface and design shape of the screen 108 serves several purposes. For example, the screen 108 maintains a standard of 3D brightness of not less than 14 foot lamberts when viewed through 3D glasses. In another example, the curvature of the screen 108 is designed to evenly distribute the light so that there is no "hot spot" normally associated with high gain screens. In yet another example, the high gain aluminized surface of the screen 108 enables the use of polarization systems for 3D, whether linear or circular polarization. The resultant shape of the theater 100 is symmetrical and can be ovoid, spherical, or other shape and made up of identical modular units that bolt together on site. The design is such that it generally takes only two people to assemble the theater 100—one to hold each module in place, while the other inserts the bolts, and each individual component weighs less than 50 lbs. (about 22.7 kilograms). The theater 100 design thus becomes an interesting visual shape that is appealing from both the inside as well as the outside, offering an appearance that is diametrically different from conventional square or rectangular theaters with flat walls, and requiring a minimum amount of space to deliver the desired movie experience.

The theater 100, in accordance with various embodiments, can be prefabricated at a factory, and can fit within standard shipping containers and be delivered to the desired site and assembled within a few days. Each modular prefabricated component, such as the panels 102, 104 and the audience seats 106, is designed to nest with mated parts so that stacking of the modules occupy minimum space for shipping. The theater 100 is scalable to any size, while benefitting from the prefabrication process, making assembly fast and inexpensive. The wide field of view, high brightness, high frame rate, and sound quality should be maintained at all scales proportionately.

The theater 100 can be scaled to accommodate a wide variety of seat numbers, but the concept is most financially beneficial when the seat numbers are scaled to fit within the existing ceiling heights of various existing facilities—such as multiplex cinemas, shopping malls, science museums, aquariums, sports facilities, zoos, planetariums, arenas, theme parks, trade shows, music events, sports events, etc. This results in the ability to quickly install the theater and begin the operation of it immediately, assuming that the available space is adequate, and that other necessary elements of parking, toilets, food service, heating/air conditioning, power, etc., are already in place. The theater 100 is designed to distribute live loads over the conventional load-bearing specifications of existing architecture, like a temporary exhibit.

For example, the theater 100 can be adapted for home or commercial use in a wide variety of sizes. An attribute of the stereoscopic experience of a 120 frame-per-second 3D motion picture projected with a single projector is that it can be scaled for smaller size while retaining a giant screen experience. This can be accomplished using a reduced scale version of the theater 100 by reducing the size of the toroidal screen 108 to as small as, for example, approximately 7 feet (about 2.1 meters) high by 16 feet (about 4.9 meters) wide, while retaining the geometry of the screen, viewer, and projector relationship. This enables small groups of viewers inside a conventional home or office with eight foot high (about 2.4 meters) ceilings. The screen can be assembled like a small tent, using the same technology as the toroidal vacuum shaping fan/sensor system on a fold-up frame. The sound system can be a conventional home theater system such as 5.1 or 7.1 surround or even Dolby Atmos® Home Theater systems. The result retains all of the giant Screen experience and viewing characteristics of larger prefabricated portable theaters, at a fraction of the cost, and can be set up in conventional living or corporate spaces such as a living room, entertainment room, office, or garage.

In some embodiments, the theater 100 includes steeply raked audience seating tiers 106 that are superior to those found in conventional stadium type cinemas. Each seat 106 directly faces a vertical axis 302 passing through the center 202 of the screen 180, such as illustrated in FIGS. 2C and 3, rather than being in straight or slightly curved rows as is the norm in conventional cinemas. In this manner, an audience member faces the center 202 region of the screen 108 while looking straight ahead from a seated position in any seat 106. The seating rake is specifically designed as a result of a light-cone 204 emitting from the projector 116, allowing the light rays to reach the screen surface 108 with just enough clearance from the audience members' reach to prevent audience members from interfering with the light. In some embodiments, the theater 100 includes between approximately 30 and 300 audience seats, although lesser or greater numbers of seats are possible.

Figure 4:
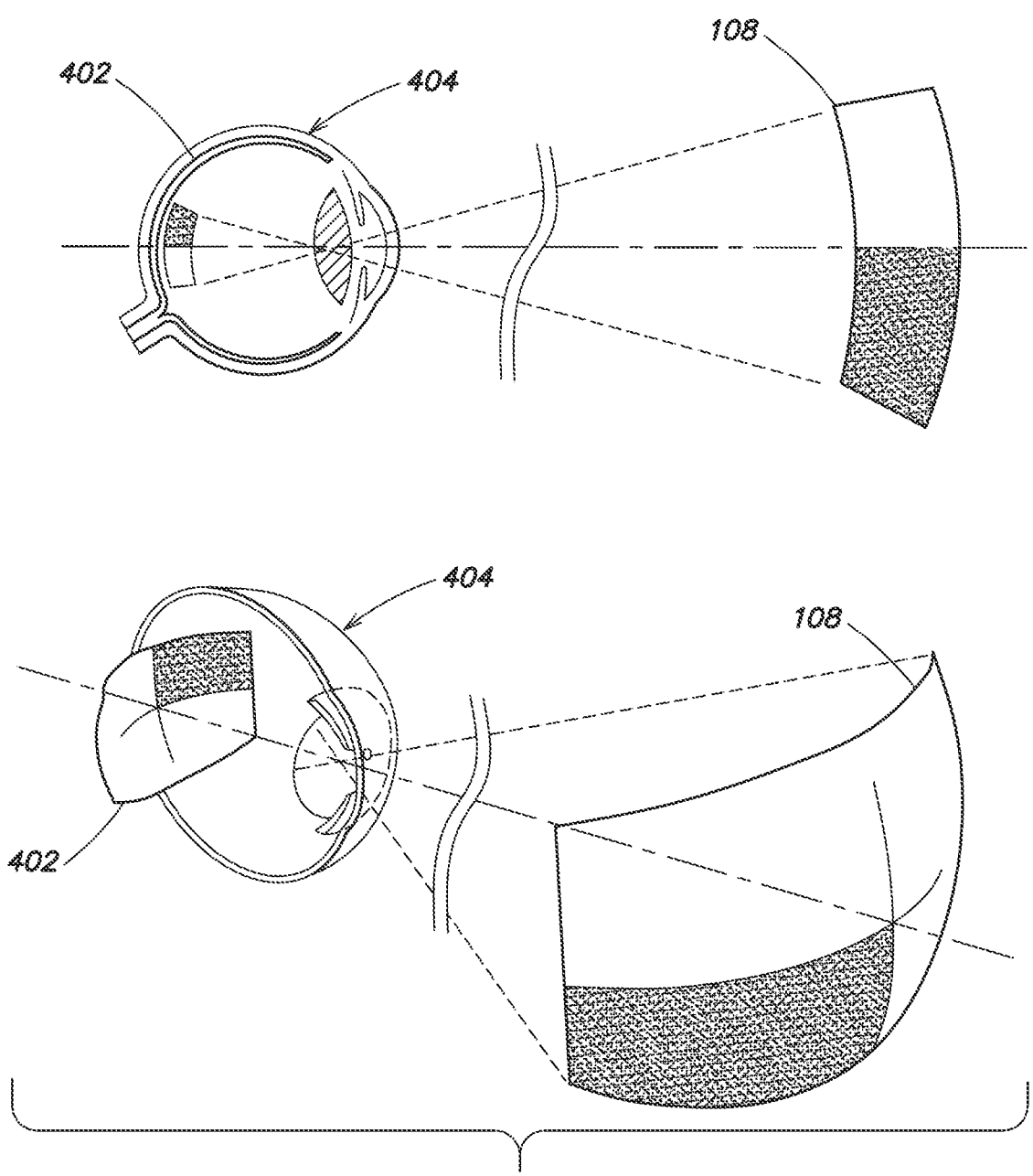
FIG. 4 shows an example wide field of view, hemispherically curved screen that mimics the hemispherically curved human retina, in accordance with an embodiment of the present disclosure.

The ultra-wide field of view made available by the hemispherically curved screen 108 mimics the human retina 402, which is an ultra-wide concave sensor matrix within the human eye 404, such as shown in FIG. 4. The conventional 24 frame per second rate of stereoscopic motion pictures projected by a single digital projector has introduced problematic "fusion frequency" and "persistence of vision" anomalies into the motion illusion by "triple-flashing" each frame of the left eye image, interleaved with "triple-flashing" of the right eye image. The resultant perceived image therefore includes objectionable motion artifacts due, in part, to the human retina's ability to seemingly blend a series of perceived images into a flicker-free stream that produces a "moving picture." In the case of 72 flashes of the right eye image combined with 72 flashes of the left eye image produces a total of 144 flashes per frame of the original 24 frames per second sequence. These "flashes" are stored in the human retina, resulting in objectionable multi-image confusion and a destruction of the correct temporal frequency of the original photography, creating the perception on the retina of several flashes that have no motion, as the eye (retina) tracks this, creating confusing overlapping images of the same frame.

Figure 5:
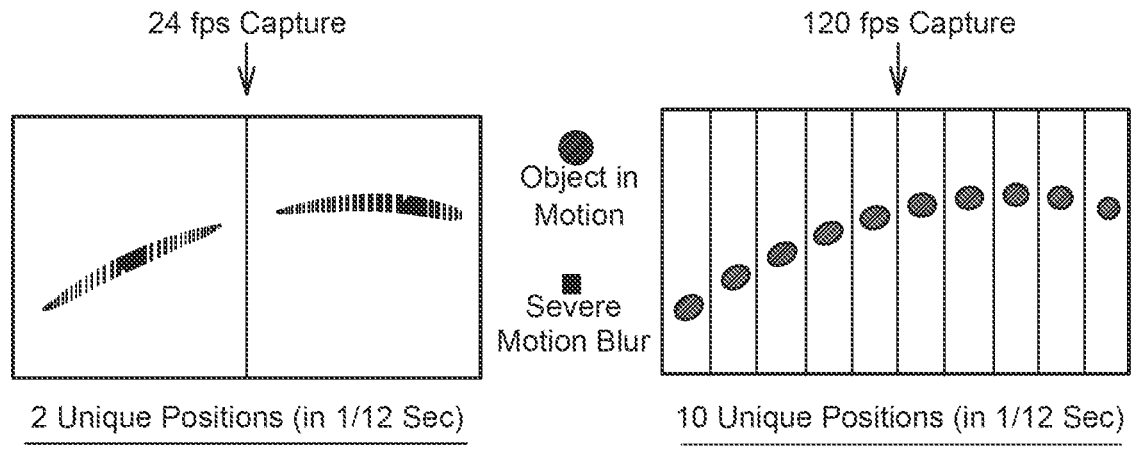
FIG. 5 illustrates several example frames of images forming a three-dimensional motion picture, in accordance with an embodiment of the present disclosure.
Figure 5:
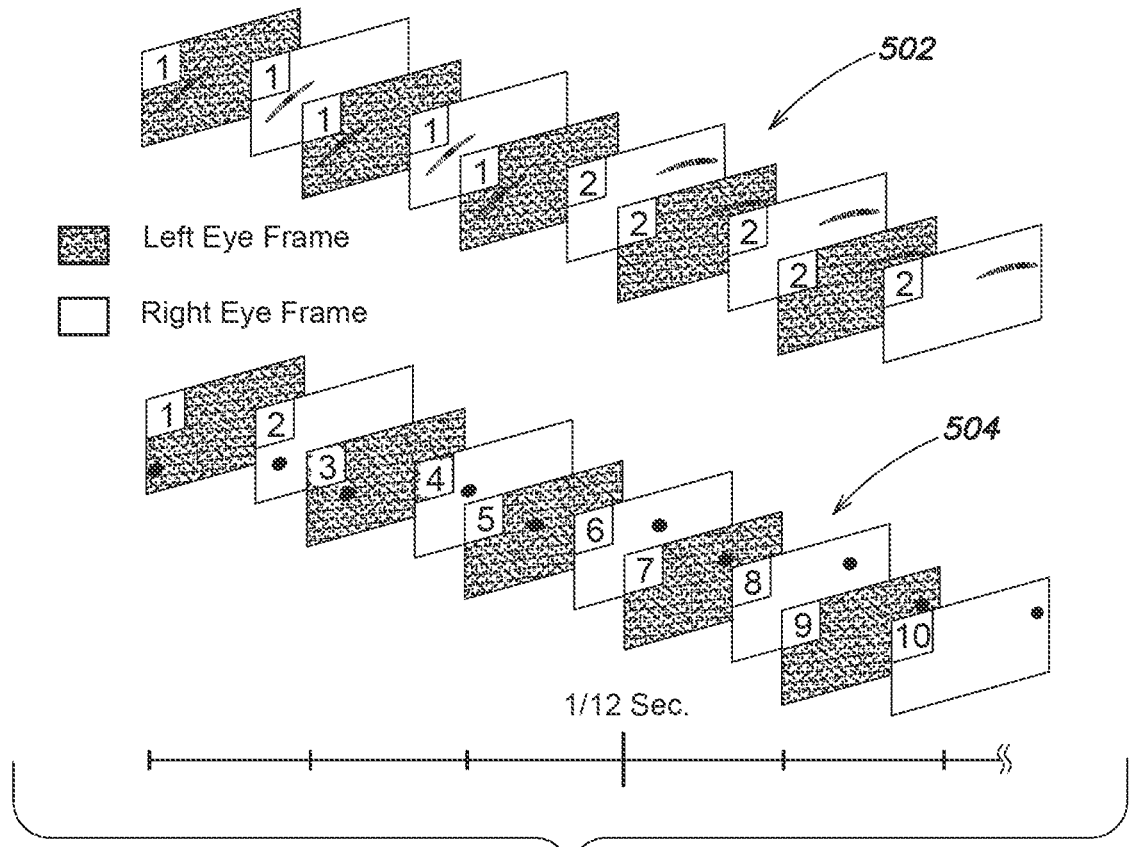

FIG. 5 illustrates several example frames of images forming a three-dimensional motion picture, in accordance with an embodiment of the present disclosure. In some embodiments, a projector 116 is included in the theater 100. The projector 116 is configured to project a moving image onto the projection screen 108 by flashing individual frames of the moving image one time each in a sequence that alternates between left eye frames as recorded at left eye recordal times and right eye frames as recorded at right eye recordal times, such as shown in FIG. 5. In a typical 3D sequence, as generally indicated at 502, both the left eye frame and the right eye frame are recorded simultaneously; however, the same frame may be flashed multiple times during projection, or some frames may not be flashed at all. By contrast, a 3D sequence, as generally indicated at 504, where each successive frame of the sequence is recorded at a successive time and projected temporally with respect to one another in the sequence to show the moving image, results in a projected frame rate of at least 120 frames per second, where the left eye frames are recorded at at least 60 frames per second and at the left eye recordal times, and where the right eye frames are recorded at at least 60 frames per second and at right eye recordal times offset from the left eye recordal times. Further details of this projection process can be found in U.S. Pat. No. 9,204,132, the entirety of which is incorporated by reference herein.

According to various embodiments, there are no objectionable motion artifacts and the extremely wide field of view is perceived as natural and real, without motion anomalies when images are projected at, for example, 60 frames of left eye imagery interleaved temporally with frames of right eye imagery, resulting in a total of 120 discrete motion positions of the images. This is due at least in part to flashing each frame only once, so that there are no overlapping images stored on the retina, thus enabling extremely fast action on the wide field of view screen.

Figure 6:
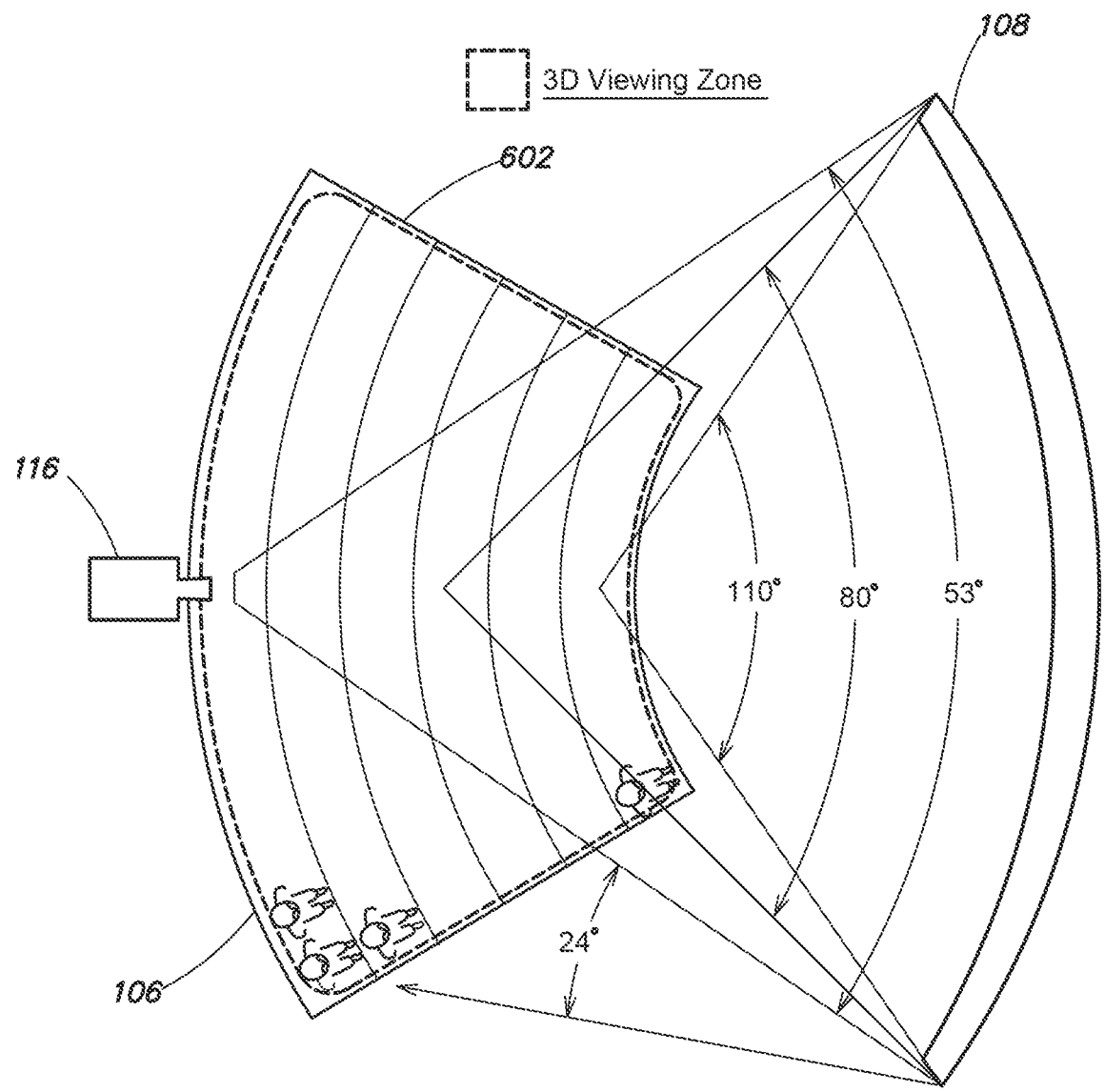
FIG. 6 shows a field of view range of the example motion picture theater of FIG. 1, in accordance with an embodiment of the present disclosure.

FIG. 6 shows a field of view range of the example motion picture theater 100 of FIG. 1, in accordance with an embodiment of the present disclosure. An attribute of projecting 120 frame per second 3D imagery at 60 frames per eye in proper temporal succession onto the hemispheric screen 108 is that the perception of stereoscopic depth and space is increased. Comfortable viewing is possible from a predetermined viewing zone 602, such as shown in FIG. 6, that limits objectionable stereoscopic convergence and focus disparity. The stereoscopic imagery can be projected in such a way that human eye convergence is synchronized with focus so that most content appears at the screen surface, which allows the human eye to converge and focus at the same location, thus reducing or eliminating eye strain.

An attribute of stereoscopic 3D projection using alternating left-right frames in sequence using a single projector is that this preserves the universal standard of motion pictures having a conventional 50% illumination per frame accompanied by 50% dark screen time. This is the natural result of digital 3D projection, and mimics the mechanical shutter that has accompanied celluloid film projection for over ninety years. Another attribute of the disclosed techniques is that the high-gain hemispherical screen's light focusing function allows the attainment of the industry standard of 14 foot lamberts of image brightness, rather than the light loss associated with 3D polarization systems that reduce the conventional 14 foot lamberts of brightness to one-quarter brightness due to loss of light through the polarizers and glasses. Yet another attribute of the disclosed techniques is that high frame rates of 120, 144, or even 240 frames per second can be utilized, if so desired, without inducing a so-called "soap opera" television appearance that is associated with high frame rate movies projected with dual projectors, for example, and 100% illumination (without flicker). This attribute retains the appearance associated with the relatively low frame rate of conventional movies (e.g., 24 frames per second), while substantially increasing the actual frame rate, for applications where such an appearance is desired.

Figure 7:
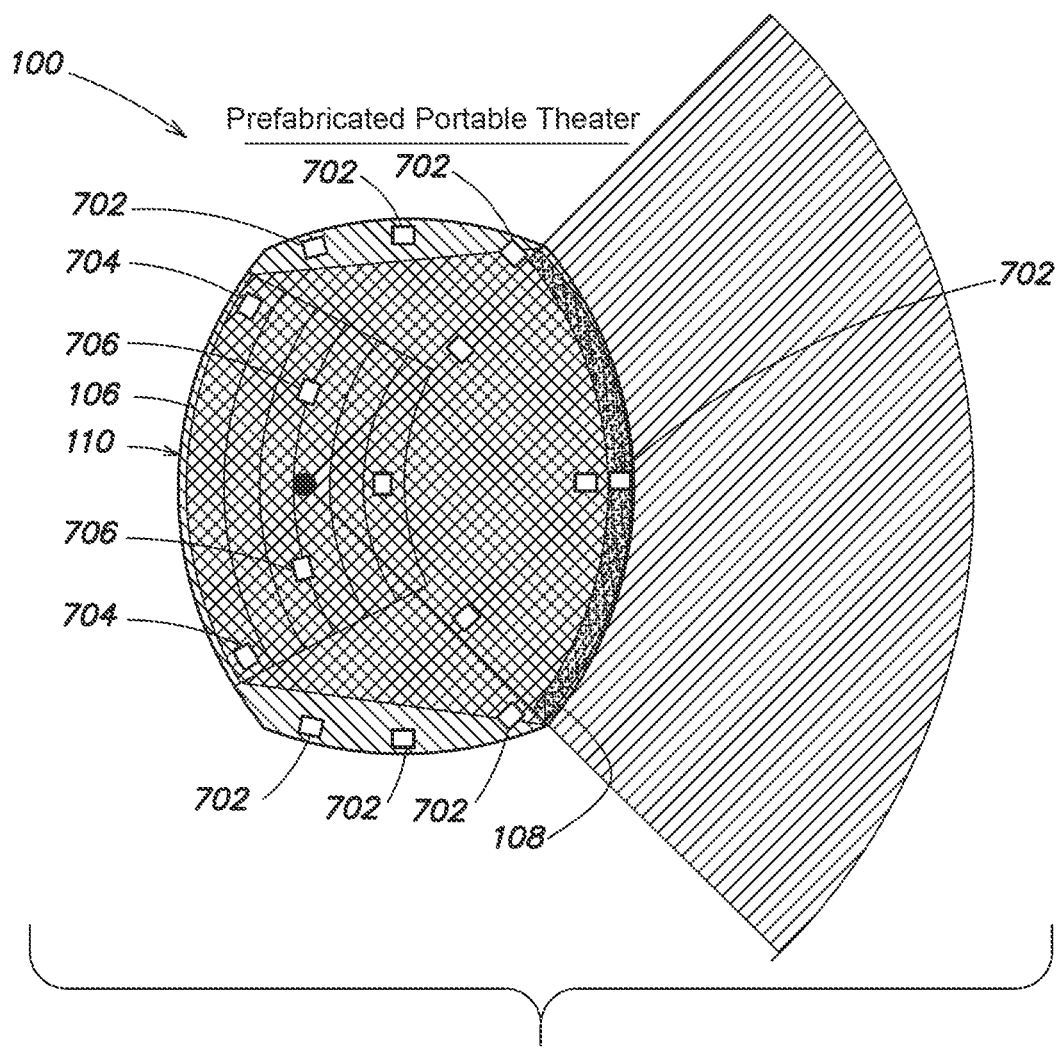
FIG. 7 shows an example speaker placement within the example motion picture theater of FIG. 1, in accordance with an embodiment of the present disclosure.

FIG. 7 shows an example speaker placement within the example motion picture theater 100 of FIG. 1, in accordance with an embodiment of the present disclosure. The theater 100 includes speakers 702, which are unique for several reasons. The vacuum screen 108 cannot be perforated; therefore, the speakers 702 are located around the top, bottom and sides of the screen 108 to create a sound image that is perceived as emanating from behind the screen via unique sound signal phasing to create a phantom sound source near the middle of the screen. This is achieved by special sound mixing/processing/phase shifting, etc. When used in conjunction with various embodiments, a high frame rate/wide field of view projection technique, such as disclosed in U.S. Pat. No. 9,204,132, creates a unique and powerful stereoscopic realism that cannot be acoustically matched by existing sound systems. Therefore, according to various embodiments, a unique layout of the speakers 702 surrounds the hemispheric screen 108, coupled with a unique location grid of surround speakers 702 around the perimeter walls 112 and ceiling 114 of the theater 110. The unique ovoid/hemispheric interior shape of the theater 110 creates an acoustic environment that includes special sound absorbing materials on the walls 112 and ceiling 114 to absorb and dissipate any standing waves of sound caused by the focusing effects of the curvature of the screen 108. To achieve very high pressure levels of low frequencies in the 20-200 Hz range, a unique configuration of 50 or more 15-inch diameter subwoofers 704 are mounted behind the seat risers 106 of each row, providing up to 120 dB of low frequency sound pressure. A unique configuration of rotary subwoofers 706 are installed at the sides of the seating riser platform 106, beneath the stairs at each side, making it possible to deliver extremely low frequency sound waves beneath the seating platform in the range of 1-20 Hz, which is unobtainable with conventional speakers. The resulting low frequency air pressure changes beneath the seating platform 106 are delivered to viewers via having a unique spring-loaded seating platform that can accommodate substantial motion that is induced by the low frequency pressures emitted by the rotary subwoofers 706. The overall acoustic design provides a unique and previously unobtained "anechoic" effect so that the resultant dynamic range of sound levels from extremely quiet to extremely loud can be obtained. An "anechoic" level of sound absorption in a theater setting is generally not recommended by acoustic engineers due to added cost and the human discomfort associated with situations with no sound. However, various embodiments utilize anechoic effects to enhance movie content moments requiring extreme quiet and tranquility by mixing environmental and musical effects in such a way as to increase audience stimulation via expanded range between loud sounds and extreme quiet.

Another unique attribute of the prefabrication and modularity of the theater 100 is that it can be easily dismantled and moved to storage or alternate location(s). The specific configuration of the modular components can take myriad forms, depending upon materials used, methods of fabrication, methods of interconnection, and functionality for sound and light control as needed for a theater purpose. The specific design relationships between the hemispheric screen 108, the projector 116, seating 106 system, sound system, and control system that the same result of improved viewer experience can be achieved by numerous materials, fabrics, structures, and components, and this disclosure is not intended to limit the myriad obvious variations of size and design.

Embodiments include a stand-alone installation of the theater 100 that can include portable, temporary, or permanent components that allow the theater 100 to be assembled and operated indoors, outdoors, and autonomously as needed for a particular site or venue. These components/aspects can include and are not limited to the generation of power, heating, air conditioning, weather resistance, lightning protection, light-trapping, ticket areas, food service, toilets, and any other necessary components as needed.

The self-contained and portable design of the theater 100 lends itself to a wide variety of applications that include education, corporate training, simulation, sales and marketing, etc. Variations in seating size from very small to very large is possible, so that unlike other fixed theater installations, the hourly capacity of viewers can be adjusted to fit the needs of the venue. Another unique attribute is that viewer capacity can be more easily and inexpensively adjusted by using multiple theaters of identical size and configuration rather than scaling up to a larger size that can entail substantially increased costs.

The theater 100 may, in some embodiments, include audio/visual systems having the capability to display a wide variety of content, including conventional media such as DVDs, Blu-ray discs, DCP, streaming, multi-media digital presentation programs (e.g., PowerPoint), real-time interactive graphics engines (e.g., Unity3D, UnReal), virtual reality, real-time interactivity, teleconferencing, live streaming and live broadcast. The content can be digitally scaled or resized to utilize as much or as little of the projection screen 108 as desired.

In some embodiments, the theater 100 includes attachment points to connect to existing HVAC ducts and existing fire suppression systems.

Numerous embodiments will be apparent in light of the present disclosure, and features described herein can be combined in any number of configurations. One example embodiment provides a portable theater including a plurality of individual panels assembled together to form a theater enclosure; a plurality of audience seats installed within the assembled theater enclosure; and a projection screen mounted within the assembled theater enclosure. The projection screen has a partial toroidal shaped reflective surface configured to reflect, toward the plurality of audience seats, a moving image as projected by a projector. In some cases, the the projector is configured to project the moving image onto the projection screen by flashing individual frames of the moving image one time each in a sequence that alternates between left eye frames as recorded at left eye recordal times and right eye frames as recorded at right eye recordal times, each successive frame of the sequence having been recorded at a successive time and projected temporally with respect to one another in the sequence to show the moving image, resulting in a projected frame rate of at least 120 frames per second, wherein the left eye frames are recorded at at least 60 frames per second and at the left eye recordal times, and wherein the right eye frames are recorded at at least 60 frames per second and at right eye recordal times offset from the left eye recordal times. In some such cases, the portable theater includes the projector. In some cases, the projection screen has a vertical axis passing through a center point of the projection screen, wherein each of the audience seats directly faces the vertical axis of the projection screen while the respective audience seat is installed within the assembled theater enclosure. In some such cases, each of the plurality of audience seats is arranged in a plurality of rows and on a raked platform such that seats in the row closest to the projection screen are lower than seats in the row furthest from the projection screen. In some cases, the projection screen is configured to provide at least a 50 degree horizontal field of view of the reflected moving image to at least one of the plurality of audience seats while the respective audience seat is installed within the assembled theater enclosure. In some cases, the projection screen is configured to provide at least a 100 degree horizontal field of view of the reflected moving image to at least one of the plurality of audience seats while the respective audience seat is installed within the assembled theater enclosure. In some cases, the portable theater includes means for mounting the projection screen within the assembled theater enclosure using vacuum pressure to hold the projection screen in position against a structural member. In some such cases, the means for mounting the projection screen within the assembled theater enclosure includes at least one fan configured to produce the vacuum pressure. In some cases, the reflective surface of the projection screen includes aluminum. In some cases, the portable theater includes a sound system including a plurality of speakers mounted outside a perimeter of the projection screen. In some such cases, the sound system further includes a plurality of subwoofers mounted behind or to one side of at least some of the audience seats. In some such cases, each of the plurality of subwoofers is configured to produce sub-audible frequencies from between approximately zero and 20 Hz. In some cases, at least one of the individual panels includes a sound absorbing material. In some cases, the plurality of individual panels are prefabricated. In some cases, at least one of the individual panels is designed to nest with at least one other individual panel such that the respective individual panels can be stacked together.

Another example embodiment provides a portable theater kit including a plurality of individual panels each configured to be assembled together to form a theater enclosure; a plurality of audience seats configured to be installed within the assembled theater enclosure; and a projection screen configured to be installed within the assembled theater enclosure. The projection screen has a partial toroidal shaped reflective surface configured to reflect, toward the plurality of audience seats, a moving image projected by a projector. In some cases, the portable theater kit includes one or more of the aspects discussed in the previous paragraph.

What is claimed is:

1. A portable theater comprising:
   a projector;
   a plurality of individual panels assembled together to define a theater enclosure;
   a plurality of audience seats installed within the assembled theater enclosure in an installed configuration; and
   a hemispherically curved, non-perforated projection screen mounted within the assembled theater enclosure, the projection screen having a partial toroidal shaped reflective surface configured to reflect, toward the plurality of audience seats, a moving image as projected by the projector,
   wherein the projection screen has a vertical axis passing through a center point of the projection screen, and wherein each of the audience seats in a row of audience seats directly faces the vertical axis of the projection screen in the installed configuration.

2. The portable theater of claim 1, wherein the projector is configured to project the moving image onto the projection screen by flashing individual frames of the moving image one time each in a sequence that alternates between left eye frames as recorded at left eye recordal times and right eye frames as recorded at right eye recordal times, each successive frame of the sequence having been recorded at a successive time and projected temporally with respect to one another in the sequence to show the moving image, resulting in a projected frame rate of about 120 frames per second, wherein the left eye frames are recorded at about 60 frames per second and at the left eye recordal times, and wherein the right eye frames are recorded at about 60 frames per second and at right eye recordal times offset from the left eye recordal times.

3. The portable theater of claim 1, wherein each of the plurality of audience seats is arranged in a plurality of rows and on a raked platform such that seats in the row closest to the projection screen are lower than seats in the row furthest from the projection screen.

4. The portable theater of claim 1, wherein the projection screen is configured to provide about a 50 degree horizontal field of view of the reflected moving image to at least one of the plurality of audience seats in the installed configuration.

5. The portable theater of claim 1, wherein the projection screen is configured to provide about a 100 degree horizontal field of view of the reflected moving image to at least one of the plurality of audience seats in the installed configuration.

6. The portable theater of claim 1, wherein the reflective surface of the projection screen comprises aluminum.

7. The portable theater of claim 1, wherein at least one of the individual panels includes a sound absorbing material.

8. The portable theater of claim 1, wherein the plurality of individual panels are prefabricated.

9. The portable theater of claim 1, wherein at least one of the individual panels is configured to nest with at least one other individual panel such that the respective individual panels stack together.

10. The portable theater of claim 1, further comprising means for mounting the projection screen within the assembled theater enclosure using vacuum pressure to hold the projection screen in position against a structural member.

11. The portable theater of claim 10, wherein the means for mounting the projection screen within the assembled theater enclosure includes at least one fan configured to produce the vacuum pressure.

12. The portable theater of claim 1, further comprising a sound system including a plurality of speakers mounted outside a perimeter of the projection screen and beneath the audience seats, at least one of the speakers beneath the audience seats configured to produce sound waves between 1-20 Hz, the sound system configured to produce an anechoic effect within the theater enclosure.

13. The portable theater of claim 12, wherein the sound system further includes a plurality of subwoofers mounted behind or to one side of at least one of the audience seats.

14. The portable theater of claim 13, wherein each of the plurality of subwoofers is configured to produce sub-audible frequencies from between approximately zero and 20 Hz.

* * * * *